(12) United States Patent
Fösel

(10) Patent No.: US 8,500,432 B2
(45) Date of Patent: Aug. 6, 2013

(54) CORRUGATOR DEVICE WITH A MOULD RELEASE DEVICE

(75) Inventor: Stefan Fösel, Breitbrunn (DE)

(73) Assignee: Unicor GmbH (DE)

( * ) Notice: Subject to any disclaimer, the term of this patent is extended or adjusted under 35 U.S.C. 154(b) by 534 days.

(21) Appl. No.: 12/682,656

(22) PCT Filed: Jun. 6, 2008

(86) PCT No.: PCT/EP2008/004541
§ 371 (c)(1),
(2), (4) Date: Jun. 14, 2010

(87) PCT Pub. No.: WO2009/049691
PCT Pub. Date: Apr. 23, 2009

(65) Prior Publication Data
US 2010/0291255 A1    Nov. 18, 2010

(30) Foreign Application Priority Data

Oct. 12, 2007  (DE) .......................... 10 2007 049 655

(51) Int. Cl.
*B29C 47/90* (2006.01)
(52) U.S. Cl.
USPC ........ 425/186; 425/326.1; 425/336; 425/369; 425/396
(58) Field of Classification Search
USPC .............. 425/186, 326.1, 336, 369, 380, 392, 425/396
See application file for complete search history.

(56) References Cited

U.S. PATENT DOCUMENTS

| | | | |
|---|---|---|---|
| 3,776,679 A * | 12/1973 | Hegler | 425/532 |
| 4,212,618 A | 7/1980 | Hegler et al. | |
| 4,787,598 A | 11/1988 | Rahn et al. | |
| 4,911,633 A | 3/1990 | Comfort | |
| 5,002,478 A | 3/1991 | Lupke | |
| 5,510,071 A | 4/1996 | Van Wonderen et al. | |
| 5,522,718 A | 6/1996 | Dietrich | |
| 5,560,941 A * | 10/1996 | Hegler et al. | 425/185 |
| 5,582,849 A | 12/1996 | Lupke | |
| 6,015,282 A | 1/2000 | Rahn | |

OTHER PUBLICATIONS

International Search Report, PCT/EP2008/004541, dated Dec. 8, 2008.

* cited by examiner

*Primary Examiner* — Yogendra Gupta
*Assistant Examiner* — Joseph Leyson
(74) *Attorney, Agent, or Firm* — Lerner, David, Littenberg, Krumholz & Mentlik, LLP

(57) ABSTRACT

A corrugator device for shaping thermoplastic corrugated pipes from a tube of molten plastics material emerging from an extrusion device may include molding jaws, grippers for returning the molding jaws from the end of a molding section to the start of the molding section, and a mold release device. The mold release device is arranged at the end of the molding section, and has a motor-driven rotary disk for interacting with the pair of molding jaws. The pair of molding jaws, which has reached the end of the molding sections, is moved apart by means of first and second drivers formed on the motor driven rotary disk.

10 Claims, 7 Drawing Sheets

CORRUGATOR DEVICE WITH A MOULD RELEASE DEVICE

CROSS REFERENCE TO RELATED APPLICATIONS

The present application is a national phase entry under 35 U.S.C. §371 of International Application No. PCT/EP2008/004541, filed Jun. 6, 2008, published in German, which claims the benefit of German Patent Application No. 10 2007 049 655.0, filed Oct. 12, 2007. The disclosures of said applications are incorporated by reference herein.

FIELD OF THE INVENTION

The invention relates to a corrugator device for shaping thermoplastic corrugated pipes from a tube of molten plastics material emerging from an extrusion device, with molding jaws which are guided so as to circulate in a linear molding section and are arranged in pairs one behind the other so as to form a molding passage in the molding section, wherein the pairs of molding jaws are formed from left-hand and right-hand molding jaws and between them enclose a cylindrical mold cavity to form the molding passage; with grippers for returning the molding jaws from the end of the molding section to the start of the molding section; with a mold release device, which is arranged at the end of the molding section, has at least one motor-driven rotary disk and interacts with the pair of molding jaws that has reached the end of the molding section in that it moves the molding jaws of the pair of molding jaws apart.

BACKGROUND OF THE INVENTION

In the case of known corrugators of the type mentioned at the beginning, a wedge device is required to ensure the mold releasing operation. Alternatively, it is necessary to use a particularly powerful drive motor to drive the rotary disk, since relatively great forces are required, at least at the beginning of the mold releasing operation, to separate the molding jaws of the pair of molding jaws.

SUMMARY OF THE INVENTION

The invention is based on the object of developing a corrugator device of the type mentioned at the beginning in such a way that the mold releasing operation is ensured without a particularly powerful drive motor or a particularly complex structural design being required.

The invention achieves this object with the subject matter of patent claim 1.

The fact that a first driver and a second driver are provided on the motor-driven rotary disk and are arranged such that the distance between the first driver and the central rotational axis is smaller than the distance between the second driver and the central rotational axis means that it is possible at the beginning of the mold releasing operation to make the first driver act with the small lever arm on the molding jaw and then make the second driver act with the large lever arm on the molding jaw, so that, with the same driving torque, a particularly high mold releasing force is transmitted at the beginning of the mold releasing operation.

Alternatively, the invention achieves the same object with the subject matter of patent claim 2. This solution provides that two motor-driven rotary disks are provided, one rotary disk acting from above and the other rotary disk acting from below on the pair of molding jaws to be released from the mold in the region of the end of the molding section. These two respectively motor-driven rotary disks provide reliable mold release without a particularly powerful drive motor having to be used or a particularly complex structural design being required.

To support the effect of the motor-driven rotary disk device, in the case of preferred configurations the rotary disk device is followed by a wedge device, which is formed and arranged in such a way that two symmetrically arranged wedge surfaces of the wedge device interact with the two molding jaws in engagement with the rotary disk in that each molding jaw slides off an assigned wedge surface.

In one embodiment, the wedge device may have two wedge surfaces arranged symmetrically at an angle with respect to a longitudinal axis of the molding section, where one of the wedge surfaces is arranged in such a way that to interact with one of the molding jaws in engagement with the rotary disk and the other of the wedge surfaces is arranged in such a way to interact with the other of the molding jaws in engagement with the rotary disk.

It is of particular advantage to use a rotary disk which interacts synchronously with both molding jaws of the pair of molding jaws to be released from the mold. It may be provided for this that the rotary disk has four drivers on the disk surface, to be specific the first driver and the second driver on the first half of the disk surface and, arranged symmetrically thereto, a further first driver and a further second driver on the second half of the disk surface.

An advantageous operating mode is obtained if the rotary disk is driven alternately clockwise and counterclockwise, preferably in each case with an angle of rotation of 90°.

By means of the rotary disk device, the molding tools are moved apart and brought into a readiness position, from which they are picked up by the assigned gripper in order to return back to the start of the molding section. In order to ensure a reliable transfer of the molding jaws by the gripper, a lowerable bar which keeps the molding jaw in the readiness position when the engagement of the gripper takes place may be provided in the machine table.

BRIEF DESCRIPTION OF THE DRAWINGS

Further design features and advantages emerge from the exemplary embodiment, which is described in more detail below with reference to the figures, in which.

DETAILED DESCRIPTION OF THE INVENTION

Figure 1:
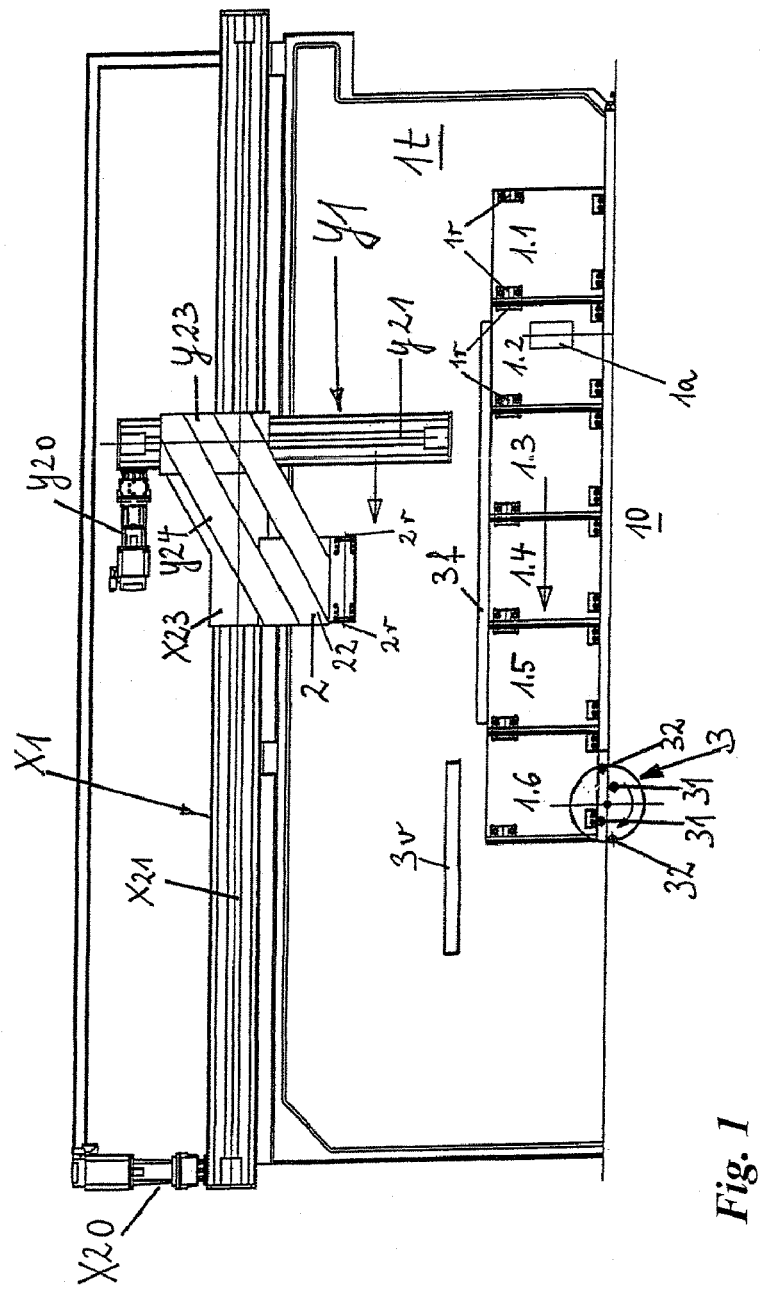
FIGS. 1 to 7 show a plan view of a right-hand half of a machine table of a corrugator device with right-hand molding jaws guided on the machine table, with six molding jaws arranged in a linear molding section, with a gripper with an associated guiding and driving device for returning the molding jaws and with a mold release device with a rotary disk device in seven successive process stages during the mold release and return of the molding jaws.

FIGS. 1 to 7 only show the right-hand half of the machine table of the corrugator. In this right-hand half, only the right-hand molding jaws 1.1 to 1.6 are shown. They are arranged one behind the other in the linear molding section 10. Together with the left-hand molding jaws (not represented), they form a linear molding passage in the molding section 10. The left-hand half of the machine table (not represented in the figures) therefore has a corresponding arrangement of the left-hand molding jaws similar to the right-hand arrangement shown in the figures. Furthermore, the left-hand half of the machine table also has a gripper device for returning the left-hand molding jaws, which is formed in a way corresponding to the gripping device represented in the figures for the right-hand molding jaws.

The exemplary embodiment of the corrugator represented in the figures has a horizontal machine table 1t, on which, in the case represented, six pairs of molding jaws in a linear molding section 10 are guided one behind the other in a row progressively along a fixed guiding bar 1f. Each pair of molding jaws is respectively formed from a left-hand and a right-hand molding jaw 1.1 to 1.6. They respectively enclose a cylindrical mold cavity. The six pairs of molding jaws guided in a row in the linear molding section 10 form a continuous molding passage in the molding section. Said passage is made up of the cylindrical mold cavities axially adjoining one another of the pairs of molding jaws.

The pairs of molding jaws in the linear molding section are driven for linear movement along the molding section 10 by means of a drive device arranged in the machine table 1t. For this, the molding jaws 1 respectively have on the bottom side a toothed rack, with which the output pinion 1a of the drive motor reaching through the machine table meshes. The return of the molding jaws 1.1 to 1.6 from the end to the start of the molding section 10 takes place by means of motor-driven grippers 2. The molding section 10 with the molding passage is arranged in the longitudinal center axis of the machine table 1t. The return of the right-hand molding jaws takes place to the right of the molding section 10 on the right-hand half of the machine table 1t and, in a corresponding way, the return of the left-hand molding jaws takes place to the left of the molding section on the left-hand half of the machine table. A separate gripper device with a gripper 2 is provided for the right-hand molding jaws 1 and a separate gripper device with a gripper 2 is provided for the left-hand molding jaws 1.

These two gripping devices in each case have a separate guiding and driving device for the assigned separate gripper 2. The right-hand gripper device with the assigned gripper 2 is arranged over the right-hand table half of the machine table 1t and the left-hand gripper device with the assigned gripper 2 is arranged over the left-hand table half of the machine table 1t.

Also arranged at the end of the molding section 10 is a mold release device with a motor-driven rotary disk 3, in order to release the end pairs of molding jaws from the mold at the end of the molding section, i.e. to move the right-hand and left-hand end molding jaws 1 apart.

In the case represented, such a mold release device is arranged on the machine table 1t so as to act on the underside of the end molding jaws and a corresponding mold release device (not shown in the figures) is arranged in the upper structure of the machine table 1t so as to act on the upper side of the end molding jaws. These two lower and upper mold release devices operate synchronously, acting from below and above.

The motor-driven rotary disk 3 of the mold release device is formed as a circular disk. It is arranged in such a way that the disk surface is arranged parallel to the table surface. The disk surface rotates about the central rotational axis, directed perpendicularly to the disk surface. The driving of the rotary disk takes place by means of an electric drive motor 1a alternately clockwise and counterclockwise with an angle of rotation of up to 90°. Arranged on the disk surface facing the molding jaws, so as to protrude perpendicularly from the disk surface, are four driver rollers 31, 31, 32, 32. These four driver rollers are symmetrically arranged as follows:

The disk surface is divided into a left-hand disk half and a right-hand disk half. The dividing line is formed by a diameter line, which is crossed in its middle by the central rotational axis.

Respectively arranged in each half is a first driver roller 31 and a second driver roller 32, the first driver roller 31 being arranged radially further inward than the second driver roller 32, i.e. the distance between the first driver roller 31 and the central rotational axis 3d is smaller than the distance between the second driver roller 32 and the central rotational axis. The arrangement of the first and second driver rollers 31, 32 in each disk half it such that the joining line between the first and second driver rollers 31, 32 arranged in a disk half respectively runs parallel to the diameter line. The joining lines run parallel to one another and the distance between the joining lines and the diameter line is the same in each case.

The arrangement of the first and second driver rollers 31, 32 in the two disk halves is symmetrical in relation to one another, to be precise in such a way that the first driver roller 31 of the first disk half and the first driver roller 31 of the second disk half are arranged mirror-symmetrically with respect to the central rotational axis and, in a corresponding way, the second driver roller 32 of the first disk half and the second driver roller 32 of the second disk half are also mirror-symmetrical with respect to the central rotational axis 3d.

During mold release, the driver rollers 31, 32 interact with the molding jaw. The essential feature is that, during the mold releasing operation, in a first step, initially the first driver roller 31 acts with its smaller lever arm on the molding jaw and then, in a second step, the second driver roller 32 acts with its larger effective lever arm on the molding jaw. Consequently, with the same torque of the motor-driven rotary disk 3, a relatively great force acts on the molding jaws via the first drivers 31 at the beginning of the mold release. As the mold release continues, the two drivers 32 then act by way of their longer lever arm with a smaller force on the molding jaws.

The various stages of the mold releasing operation are represented by the example of the right-hand molding jaws 1.1 to 1.6 in the seven FIGS. 1 to 7, showing specifically:

FIG. 1:

The rotary disk 3 is driven clockwise. The driver roller 31 lies against the longitudinal inner edge of the molding jaw 1.6. The driver roller 31 presses the molding jaw 1.6 out of the central passage. The short lever arm is active by way of driver roller 31 and transmits a relatively great force to the molding jaw.

FIG. 2:

The rotary disk 3 continues to be driven clockwise. The driver roller 31 and the driver roller 32 lie against the inner longitudinal edge of the molding jaw 1.6. The driver roller 31 and the driver roller 32 press the molding jaw 1.6, which has already moved out by a first amount, further out of the central passage. The longer lever arm of the driver roller 32 is active and transmits a lower force to the molding jaw 1.6 than in the stage previously shown.

Figure 3:
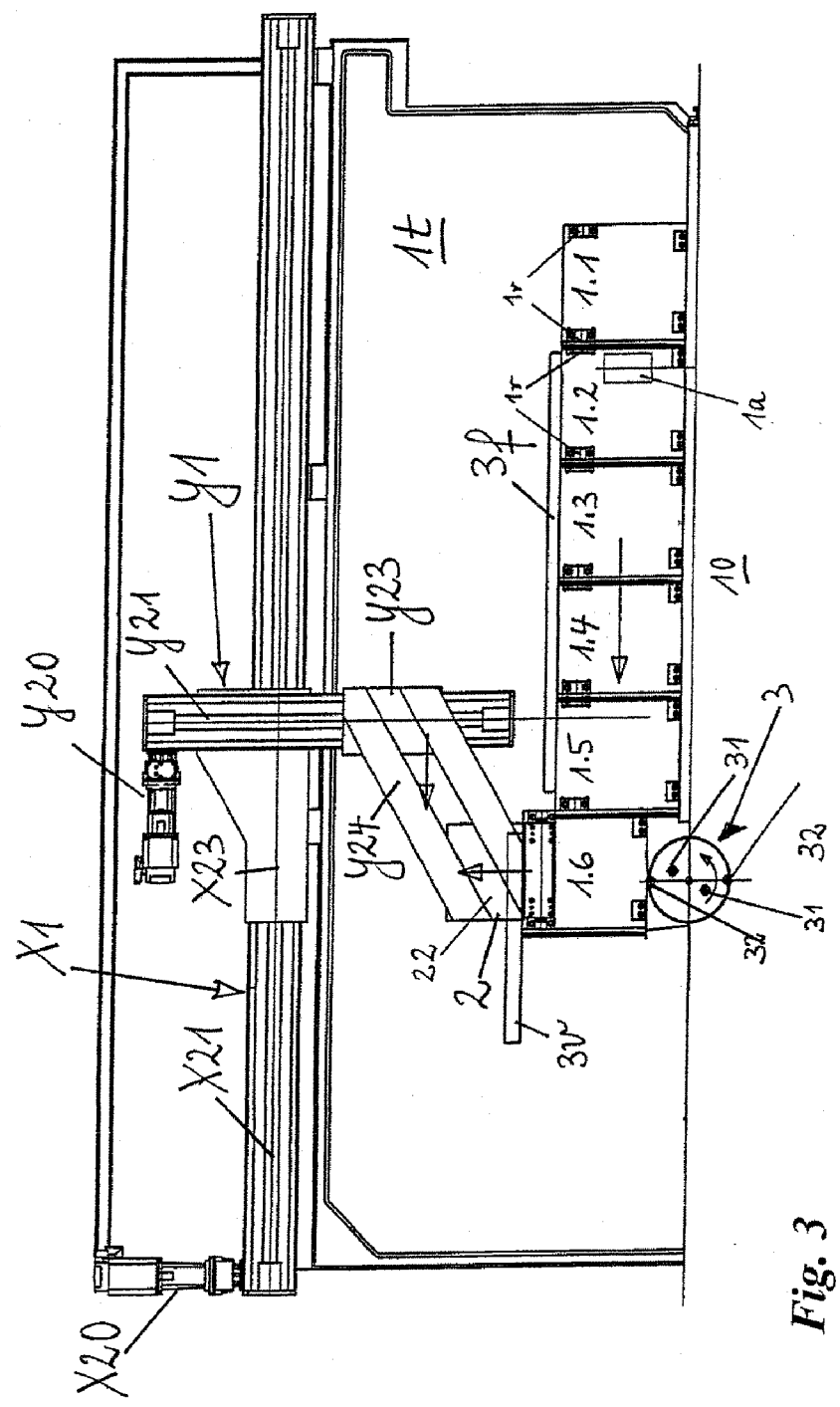
Figure 4:
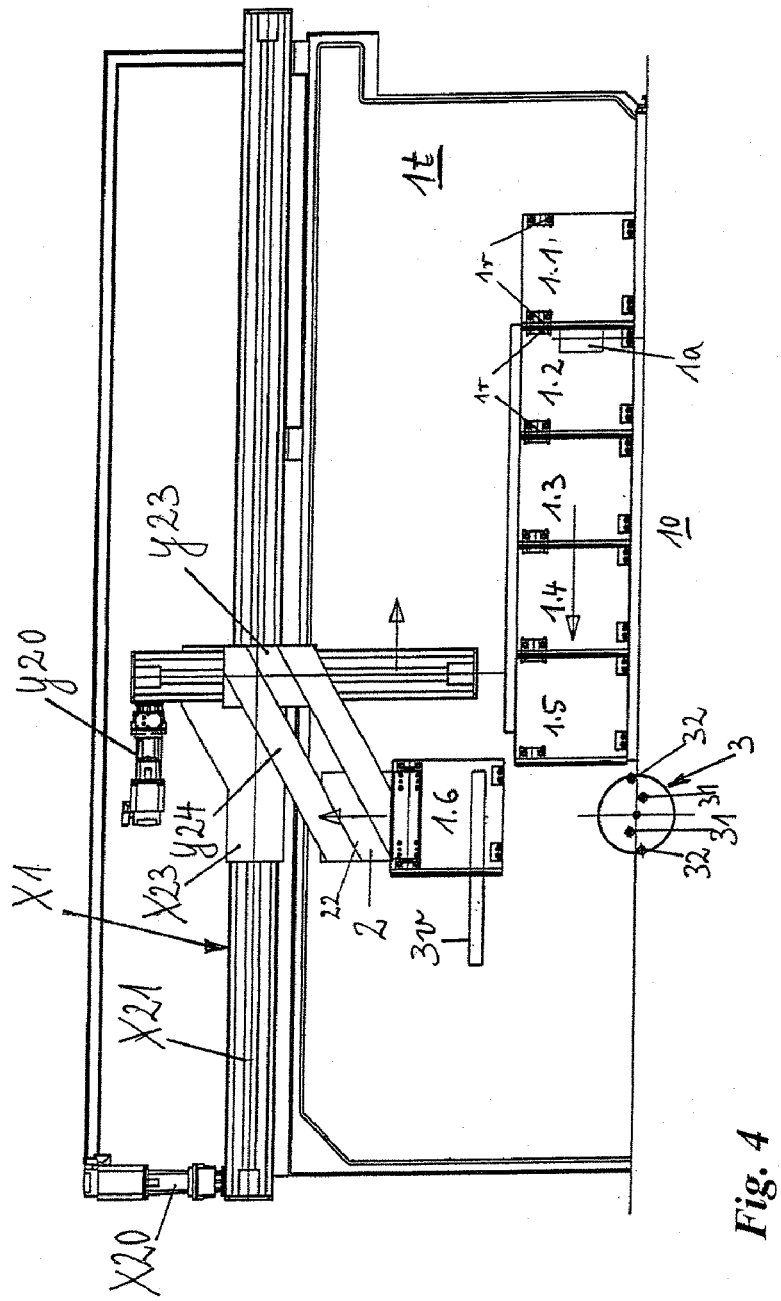
Figure 5:
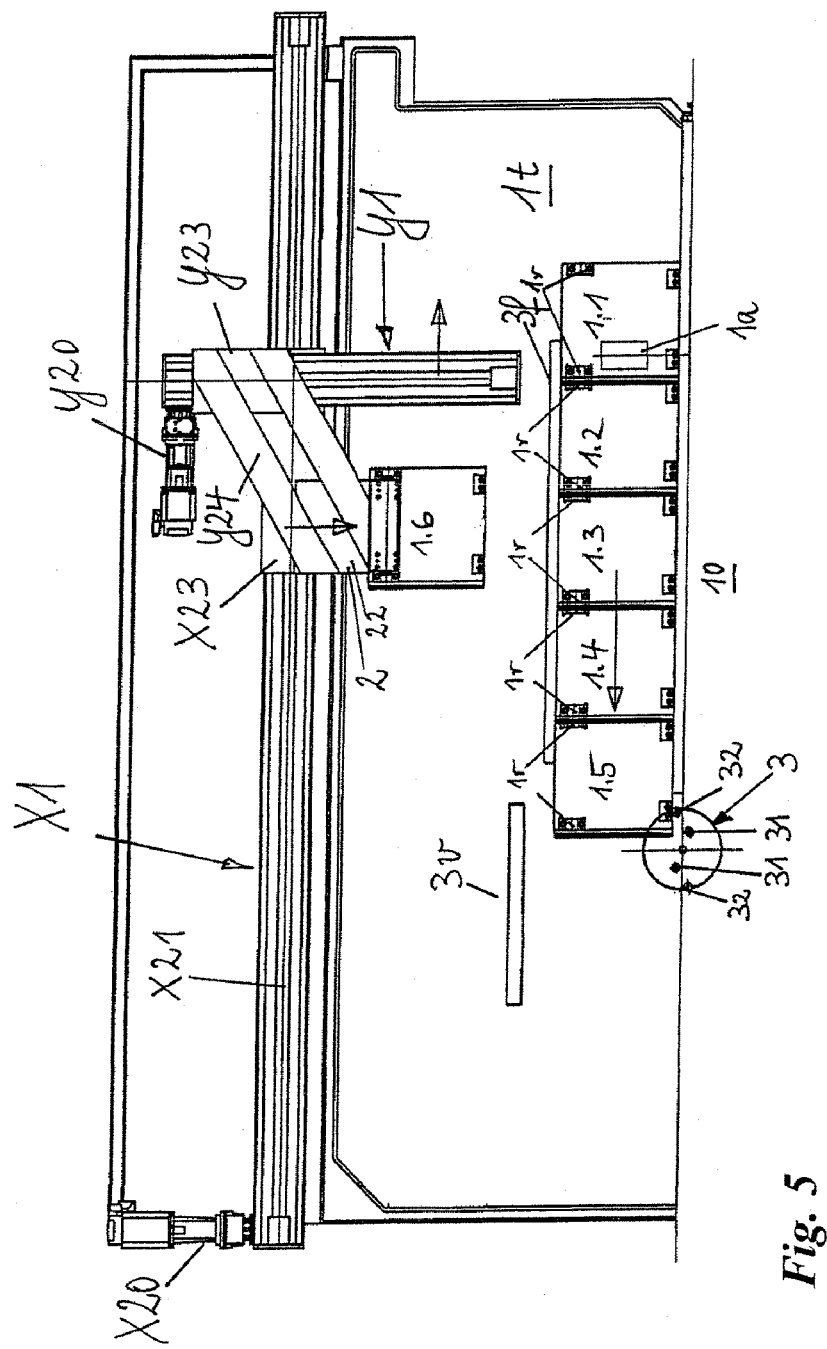
Figure 6:
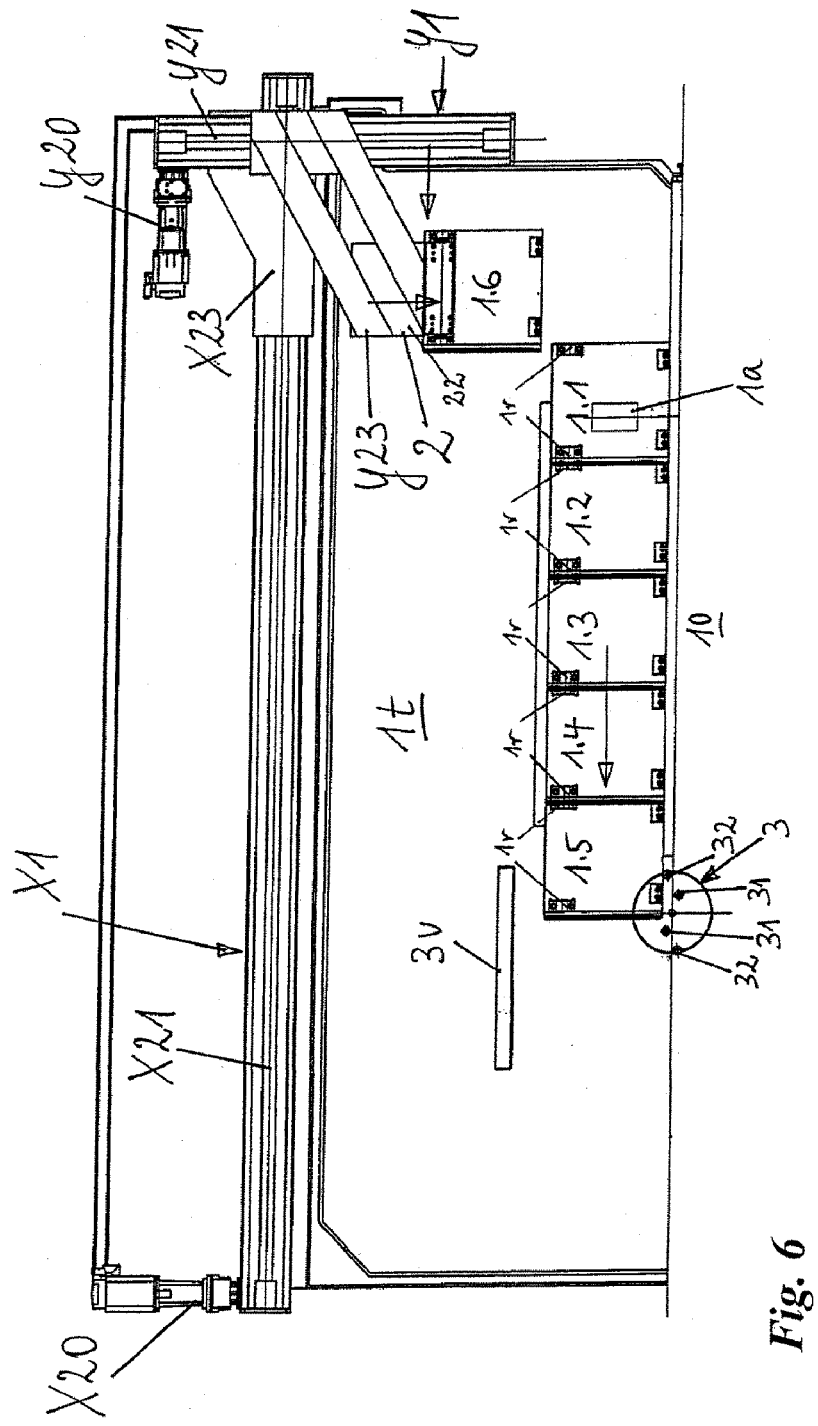
Figure 7:
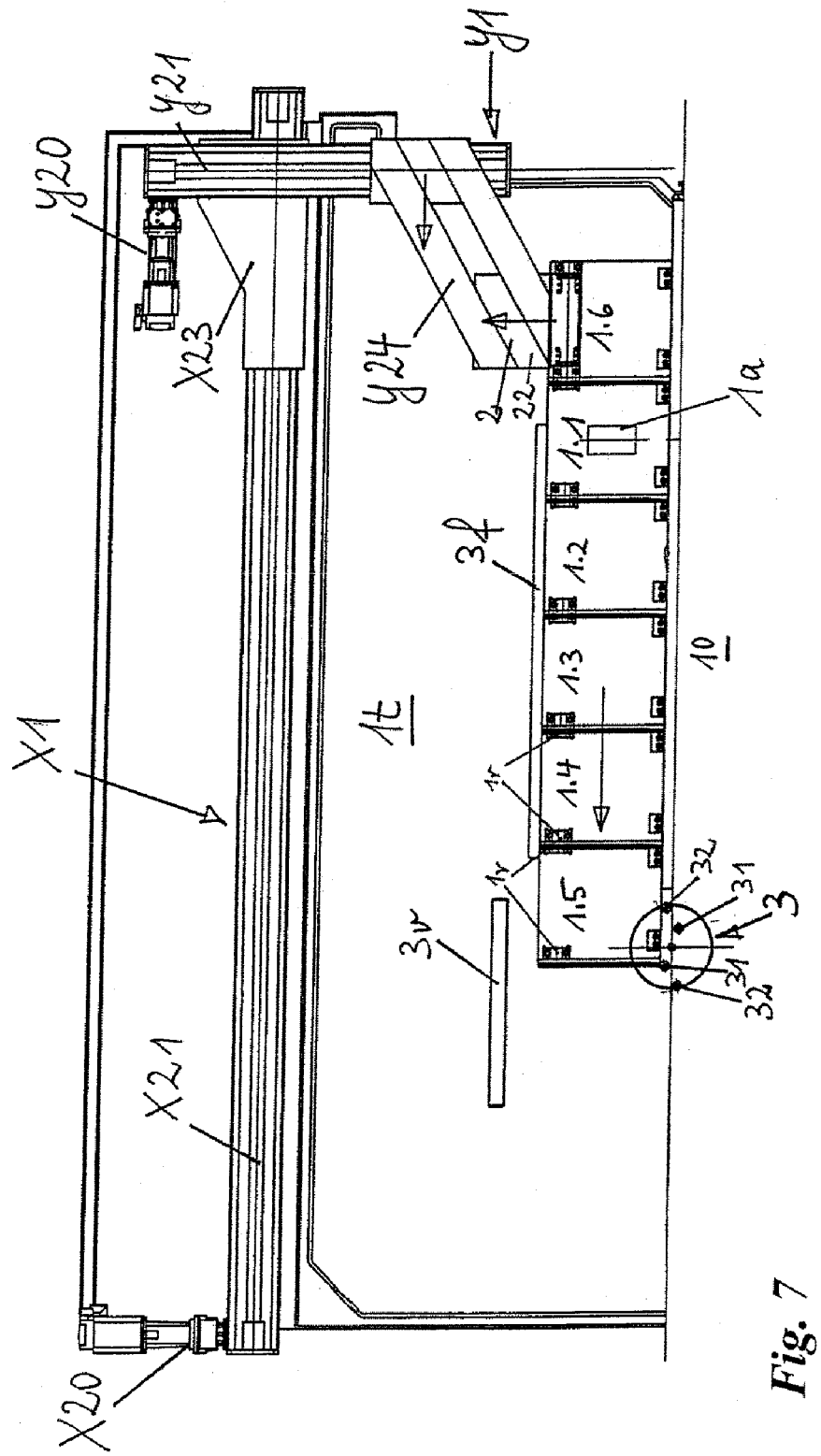

FIG. 3:

The rotary disk has reached its 90° rotational position. The driver roller 32 alone lies against the longitudinal inner edge of the molding jaw 1.6. The molding jaw has now reached its moved-out position and lies with the longitudinal outer edge against the moved-out guiding bar 3v. The guiding bar 3v provides a stable alignment of the molding jaw parallel to the molding channel 10 in the readiness position represented and during the coupling operation of the gripper 2. In FIG. 3, the gripper 2 has in the meantime been moved up against the molding jaw 1.6 disposed in the readiness position and is ready to engage with the molding jaw. The rotary disk 3 is then driven counterclockwise, in order to turn it back again by an angle of rotation of 90° into its starting position.

FIG. 4:

The lowerable guiding bar 3v has now been lowered into the machine table 1t. The gripper 2 guides the engaged molding jaw 1.6 over the lowered guiding bar 3v outward in the Y direction and at the same time back in the direction of the start of the molding section 10 in the X direction. The rotary disk 3 has in the meantime turned back into its starting position and is now stationary. The molding jaw 1.5 has moved further in the direction of the end of the molding section, but is still not in operative connection with the drivers of the rotary disk 3.

FIG. 5:

The guiding bar 3v has in the meantime been raised out of the machine table 3t again. The rotary disk 3 is still stationary in its starting position. The molding jaw 1.5 is then moved further into the region of the rotary disk 3 and has already come to lie against the driver roller 32. However, it is not yet lying against the driver roller 31. The gripper 2 continues to engage the molding jaw 1.6. It has not yet moved the molding jaw 1.6 completely into the starting position at the start of the molding section.

FIG. 6:

The molding jaw 1.5 has now been advanced further up to the end of the molding section 10. It lies on the driver roller 32. However, it is not yet lying on the driver roller 31. The rotary disk 3 is still stationary. The molding jaw 1.6 continues to be in engagement with the gripper 2, but has now reached the position immediately before moving in at the start of the molding section 10. It is just being moved by the gripper 2 into its starting position in the Y direction.

FIG. 7:

The molding jaw 1.6 has now been moved into its starting position at the start of the molding section 10. The engagement with the gripper 2 is just being released and then the gripper 2 is moved away outward in the Y direction. The molding jaw 1.5 is now lying against the driver roller 31 and against the driver roller 32. The rotary disk 3 is still stationary. This is immediately followed by the stage as represented in FIG. 1, but advanced by a molding jaw, i.e. the mold releasing operation of the molding jaw 1.5 takes place.

Figure 2:
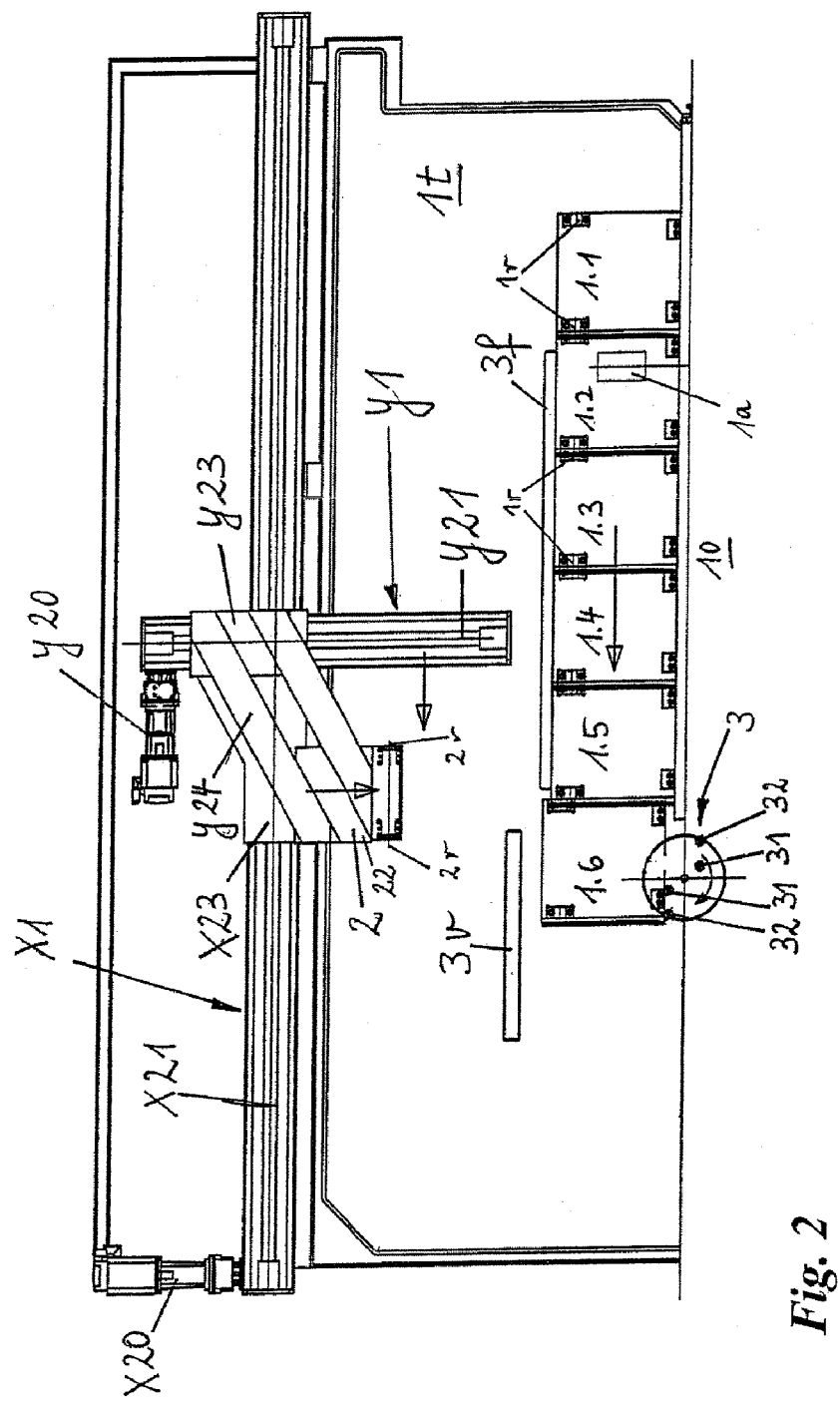

The mold release of the left-hand molding jaws 1 takes place in a corresponding way by means of the same rotary disk 3, to be precise with the two further drivers 31, 32 acting on the left-hand molding jaws that are not represented in FIGS. 2.1. to 2.7.

As already mentioned, the return of the molding jaws takes place by means of grippers 2, a gripper 2 with a separate guiding and driving device being provided for the right-hand molding jaws and a gripper 2 with a separate guiding and driving device being provided for the left-hand molding jaws.

The structural design and function of the gripping device is now described with reference to the right-hand gripper device, as it is represented in FIGS. 1 to 7. The gripper device has a linear X guiding rail X1, which is installed on the machine table 1t. This X guiding rail X1 extends in the X direction into the vicinity and along the right-hand outer edge of the machine table, as can best be seen in FIG. 1. It has a guiding housing with an upwardly open guiding slit, which extends along the housing in the X direction. In the guiding housing, a belt X21 is guided in the X direction, driven in a circulating manner by means of a servo motor X20. The servo motor X20 is mounted at the end on the housing of the guiding rail X1. Guided in the guiding slit is an X driver X22, which is connected to the circulating belt and is connected to a carriage X23 guided in a resting manner on the housing of the guiding rail. The X driver X22 is concealed by the carriage X23 in the plan-view representation of the figures.

A Y rail device Y1 is fixedly mounted on the carriage X23. The Y rail Y1 extends in the Y direction, i.e. transversely to the X direction, to be precise from the X guiding rail Y1 to the center axis, i.e. transversely in relation to the axis of the molding section 10. The Y guiding rail Y1 is constructed analogously to the X guiding rail X1. It is merely made shorter axially. It has a Y guiding housing, likewise with an upwardly open guiding slit, which extends in the Y direction. Guided in the Y guiding housing is a belt, motor-driven so as to circulate in the Y direction. Serving as the drive motor is likewise a servo motor Y20, which is mounted on the Y guiding housing. The Y driver Y22, connected to the circulating belt Y21, reaches in a corresponding way through the guiding slit in the Y housing and is connected to a carriage Y23 guided in a resting manner on the Y housing. The Y driver Y22 is concealed by the carriage Y23 in the plan-view representation of the figures. The gripper 2 is rigidly mounted on the carriage Y23 by means of an angle support Y24. The angle support Y24 extends at an angle of about 45° to the Y direction, so that the gripper 2 is facing with its engaging side perpendicularly in relation to the longitudinal axis of the molding section 10.

The gripper 2 has on its engaging side a locking bolt device 2r, which is connected by way of a toggle lever mechanism and to an actuating motor 22 arranged on the gripper head. By means of the actuating motor 22, the toggle lever mechanism is driven for actuating the locking bolt 2r. For engaging, the locking bolts 2r are moved apart by means of the driven toggle lever mechanism. For releasing, the locking bolts 2r are moved together in the opposite direction by means of the driven toggle lever mechanism. The line of movement of the locking bolts 2r is a straight axis in which the axes of the locking bolts 2r are in line. The molding jaws respectively have a locking hole device 1r on the outer side facing away from the molding section 10. It comprises two locking holes 1r, which are axially in line with one another and in which the locking bolts 2r of the gripper 2 can lock and unlock in the coupling position.

The corrugator represented operates as follows:

The tube of molten plastics material emerging from a die device (not represented) of an extruder runs through the molding passage, which is formed in the molding section 10 by the traveling pairs of molding jaws arranged one behind the other. The molding jaws 1.1 to 1.6 are driven on the bottom side in the X direction by means of the output pinion 1a of the drive motor. By means of the grippers 2, the molding jaws 1.1 to 1.6 are respectively returned from the end of the molding section 10 to the start. To release the pairs of holding jaws from the mold at the end of the molding section 10, the mold release device with the motor-driven rotary disk 3 is arranged at the end of the molding section 10.

In the molding passage of the corrugator, the tube of molten plastics material is cooled and molded to form a corrugated pipe. At the end of the molding passage, the finished molded corrugated pipe emerges as an endless pipe.

For the molding and cooling in the molding passage, the corrugator has vacuum and cooling devices known per se, which are not described in any more detail in the present application.

LIST OF DESTINATIONS 1.1 to 1.6 Molding jaws
1t Machine table
1a Output pinion

1f Fixed guiding bar
1r Locking holes for each gripper
2r Locking bolt device
22 Locking bolt actuating motor
3 Rotary disk
31,32 Driver rollers
3d Rotary axis
3v Lowerable guiding bar
4 Wedge device
10 Molding section
X1 Guiding device in X direction
X20 Servo motor
X21 Driven belt
X22 Driver
X23 Carriage
Y1 Rail device in Y direction
Y20 Servo motor
Y21 Driven belt
Y22 Driver
Y23 Carriage
Y24 Angle support

The invention claimed is:

1. A corrugator device for shaping thermoplastic corrugated pipes from a tube of molten plastics material emerging from an extrusion device,
with molding jaws which are guided so as to circulate in a linear molding section and are arranged in pairs one behind the other so as to form a molding passage in the molding section, wherein the pairs of molding jaws are formed from left-hand and right-hand molding jaws and between them enclose a cylindrical mold cavity to form the molding passage;
with grippers for returning the molding jaws from the end of the molding section to the start of the molding section;
with a mold release device, which is arranged at the end of the molding section, has at least one motor-driven rotary disk and interacts with the pair of molding jaws that has reached the end of the molding section in that it moves the molding jaws of the pair of molding jaws apart;
characterized
in that the motor-driven rotary disk is formed with a central rotational axis perpendicularly on its disk surface and at least two drivers arranged on the disk surface, the distance between the first driver and the central rotational axis being smaller than the distance between the second driver and the central axis;
in that the molding jaws are guided in such a way that, in the region of the end of the molding section, initially the first driver of the rotary disk interacts with the molding jaw to be released from the mold and, with further turning of the rotary disk, the second driver comes into engagement with this molding jaw.

2. The corrugator device for shaping thermoplastic corrugated pipes from a tube of molten plastics material emerging from an extrusion device, as claimed in claim 1,
characterized
in that at the end of the molding section a first such motor-driven rotary disk is arranged with its disk surface facing the underside of the pair of molding jaws positioned there and a second such motor-driven rotary disk is arranged with its disk surface facing the upper side of the same pair of molding jaws in such a way that the first and second rotary disks act via their drivers on the molding jaws of the end pair of molding jaws so as to engage them from below and from above, in order to move the molding jaws outward.

3. The corrrugator device as claimed in claim 2,
characterized
in that a first driver and a second driver are arranged on a first half of the disk surface and a further first driver and a further second driver are arranged symmetrically on a second half of the disk surface, to be precise in such a way that the first driver and the second driver interact synchronously with the two molding jaws of the pair of molding jaws guided to the end of the first molding section.

4. The corrrugator device as claimed in claim 3, characterized
in that first driver and the second driver are arranged on a joining line which runs parallel to a diameter line on the disk surface and likewise runs parallel to a second joining line between the further first driver and the further second driver on the disk surface, the distance between the first joining line and the diameter line being the same as the distance between the second joining line and the diameter line.

5. The corrrugator device as claimed in claim 3,
characterized
in that the two first drivers are arranged mirror-symmetrically in relation to one another about the central rotational axis and in that the two second drivers are arranged mirror-symmetrically in relation to one another about the central rotational axis.

6. The corrrugator device as claimed in claim 1,
characterized
in that the rotary disk is driven alternately clockwise and counterclockwise.

7. The corrrugator device as claimed in claim 1,
characterized
in that a lowerable linear guiding bar is arranged in the region of the end of the linear molding section, parallel and offset with respect to the longitudinal axis of the linear molding section.

8. The corrrugator device as claimed in claim 1,
characterized
in that the rotary disk is followed by a wedge device with a wedge surface, which is arranged in such a way that the wedge surface interacts with the molding jaws in engagement with the rotary disk in that the molding jaw slides off the wedge surface.

9. The corrrugator device as claimed in claim 8, characterized
in that the wedge device has two wedge surfaces arranged symmetrically at an angle with respect to the longitudinal axis of the molding section, the one wedge surface being arranged in such a way that it interacts with the one molding jaw in engagement with the rotary disk and the other wedge surface being arranged in such a way that it interacts with the other molding jaw in engagement with the rotary disk.

10. The corrrugator device as claimed in claim 6, wherein the rotary disk is driven alternately clockwise and counterclockwise in each case with an angle of rotation of 90°.

* * * * *

UNITED STATES PATENT AND TRADEMARK OFFICE
CERTIFICATE OF CORRECTION

| | | |
|---|---|---|
| PATENT NO. | : 8,500,432 B2 | Page 1 of 1 |
| APPLICATION NO. | : 12/682656 | |
| DATED | : August 6, 2013 | |
| INVENTOR(S) | : Stefan Fösel | |

It is certified that error appears in the above-identified patent and that said Letters Patent is hereby corrected as shown below:

In the Claims

Column 8, Claim 4, line 17 after "that" insert --the--

Signed and Sealed this
Fourth Day of August, 2015

Michelle K. Lee
*Director of the United States Patent and Trademark Office*